(12) United States Patent
Lee

(10) Patent No.: US 6,460,822 B1
(45) Date of Patent: Oct. 8, 2002

(54) VEHICLE ENGINE MOUNT

(75) Inventor: Sang Cheon Lee, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/925,044

(22) Filed: Aug. 7, 2001

(30) Foreign Application Priority Data

May 21, 2001 (KR) ........................................ 2001-27728

(51) Int. Cl.$^7$ ............................................... F16M 13/00
(52) U.S. Cl. ..................................... 248/635; 638/674
(58) Field of Search ............................... 248/635, 638, 248/674, 675, 562; 180/297, 292, 788

(56) References Cited

U.S. PATENT DOCUMENTS

| | | | |
|---|---|---|---|
| 4,494,723 A | * 1/1985 | Kobucki et al. | ............ 248/635 |
| 5,035,397 A | 7/1991 | Yamada | ...................... 248/638 |
| 5,094,425 A | 3/1992 | Stephens | .................... 248/605 |
| 5,915,727 A | * 6/1999 | Bonnville | ................... 280/788 |

FOREIGN PATENT DOCUMENTS

JP          2001-3987 A   *  9/2001

* cited by examiner

*Primary Examiner*—Ramon O. Ramirez
(74) *Attorney, Agent, or Firm*—Christie, Parker & Hale, LLP

(57) ABSTRACT

The invention discloses a vehicle engine mount having a mounting rubber bush (110), a fixing portion (111) and engagement portion (112) being integrally formed, the mounting rubber bush (110) being inserted into the frame (200) forming the vehicle body, the fixing portion (111) for engaging the mounting rubber bush (110) in the frame (200) by bolt (120), and the engagement portion (112) being engaged with the engine bracket (310) to connect the mounting rubber bush (110) to the power train (300). In mounting the mounting rubber bush (110) in the engine room, the mounting rubber bush (110) is inserted into the insertion hole (210) formed at the frame (200) and the fixing portion (111) is engaged to the frame (200) by bolt (120). In the engagement hole (112a) of the engagement portion (112) formed at the mounting rubber bush (110), the stud bolt (311) formed at the engine bracket (310) is inserted for engagement by nut 130, thereby improving the assembly workability.

6 Claims, 3 Drawing Sheets

VEHICLE ENGINE MOUNT

CROSS-REFERENCE TO RELATED APPLICATION

This application claims priority of Korea patent Application No. 2001-27728, filed on May 21, 2001.

BACKGROUND OF THE INVENTION

1. Field of the Invention

This invention relates to a vehicle engine mount, and more particularly, to the vehicle engine mount in which a mounting rubber bush supporting a power train can be installed at a desired position having a small installation space, without interference with the other installations in the engine room.

2. Description of the Prior Art

Generally, the engine room includes an engine mount which prevents the direct transmission of the vibration and shock originated from the power train to the vehicle body, to reduce the vibration and noise and improve the passengers' comfort.

The conventional vehicle engine mount in FIG. 1 comprises an engine bracket 310' fixed at a power train 300'; a mounting rubber bracket 120' engaged with the engine bracket 310'; a mounting rubber bush 110' fixed at the mounting rubber bracket 120'; and a body bracket 210' for connecting the mounting rubber bracket 120' with the mounting rubber bush 110' to a frame 200'.

Each of the body bracket 210' and the engine bracket 310' is fixed at the frame 200' forming the vehicle body and the power train 300', and the body bracket 210' and the engine bracket 310' are engaged with the mounting rubber 120' having the mounting rubber bush 110' via the bolts, so that the mounting rubber bush 110' absorbs the vibration and shock originated from the power train 300'.

The engine mount requires many assembly components, such as the mounting rubber 120' with the mounting rubber bush 110', the engine bracket 310', the body bracket and so on, in order that the mounting rubber bush 110' absorbs the vibration and shock, which results in an increase in the assembly components and assembly workability and decreases the manufacturing costs. Further, since the large installation space is needed, it is difficult that the engine mount is installed at a desired position, without interference with the other installations.

SUMMARY OF THE INVENTION

Accordingly, it is an object of the present invention to provide a vehicle engine mount wherein the mounting rubber bush is installed at a desired position in a small space, without interference with the other installations in the engine room.

In order to achieve the object, the present invention comprises a mounting rubber bush, a fixing portion and an engagement portion, the mounting rubber bush being inserted into the frame forming the vehicle body, the fixing portion for engaging the frame by bolt to maintain the mounting rubber bush in the frame, and the engagement portion being engaged with the engine bracket to connect the mounting rubber bush to the power train.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
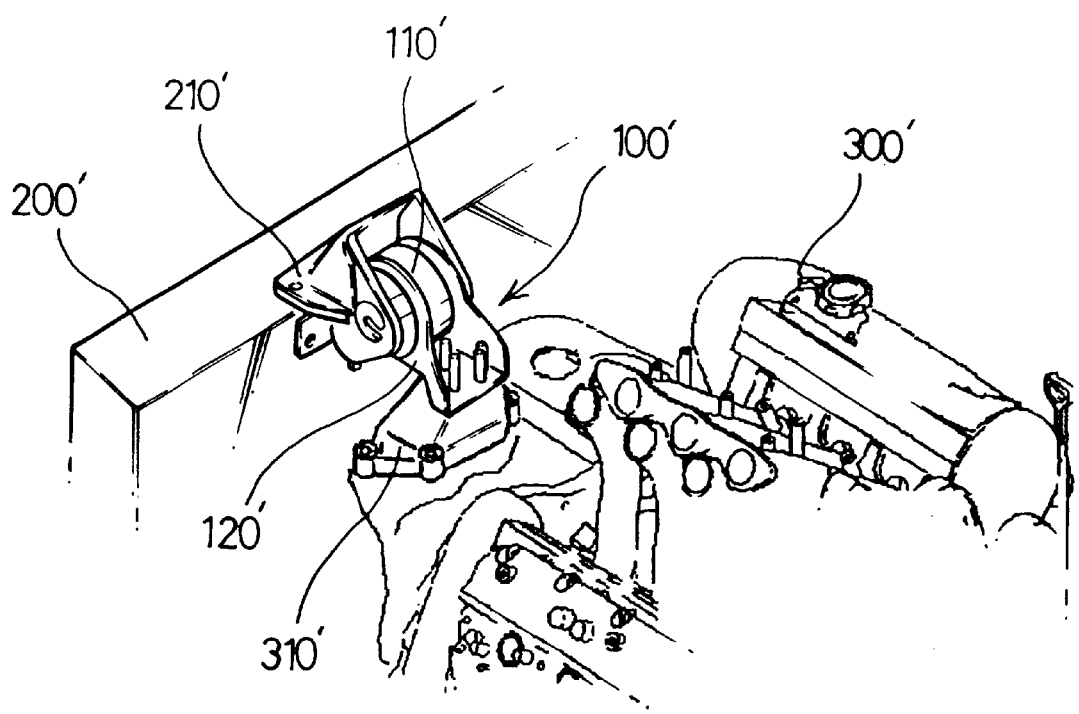
FIG. 1 is a sectional view showing the installation of the conventional engine mount.
Figure 2:
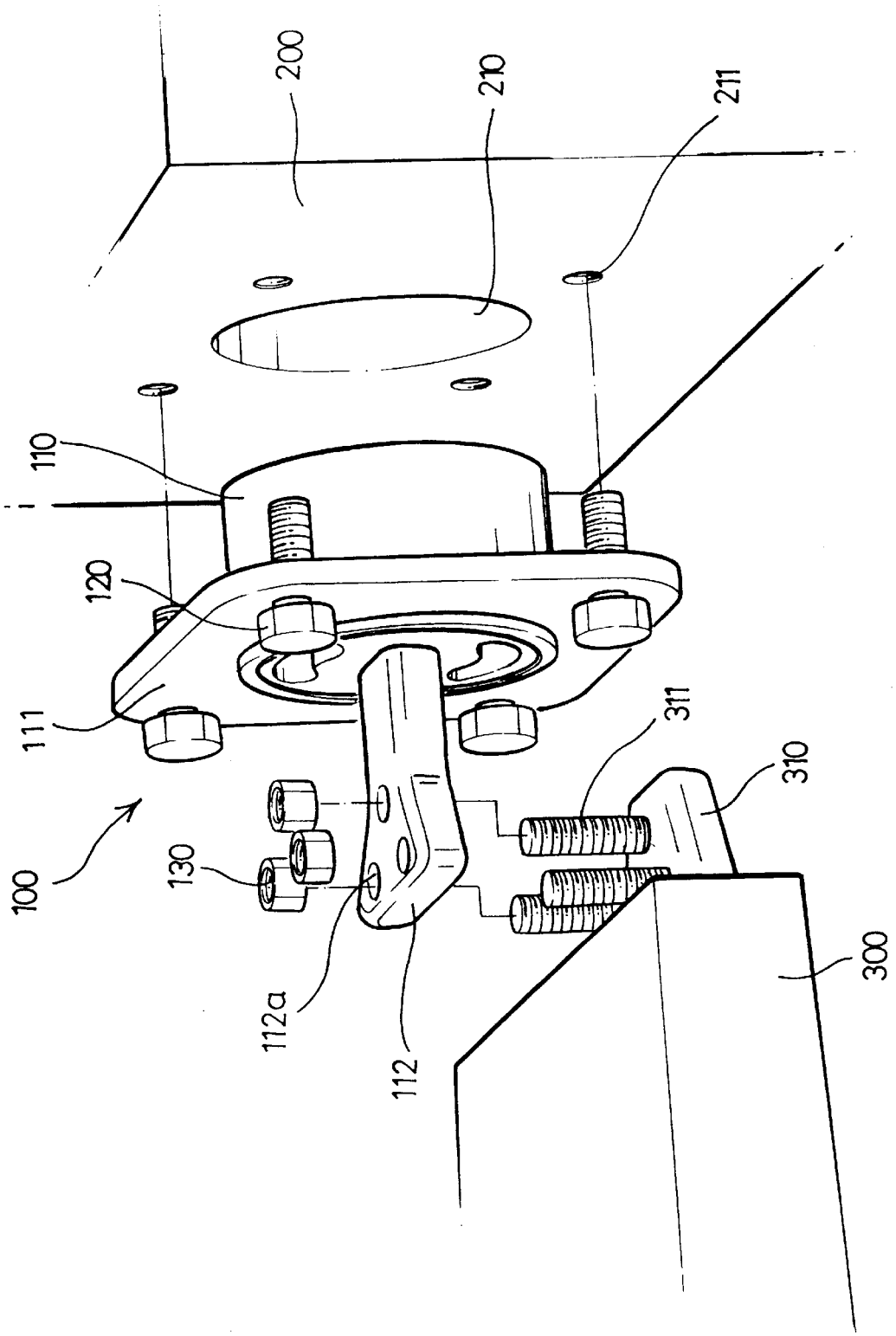
FIG. 2 is an exploded perspective view of the present invention.
Figure 3:
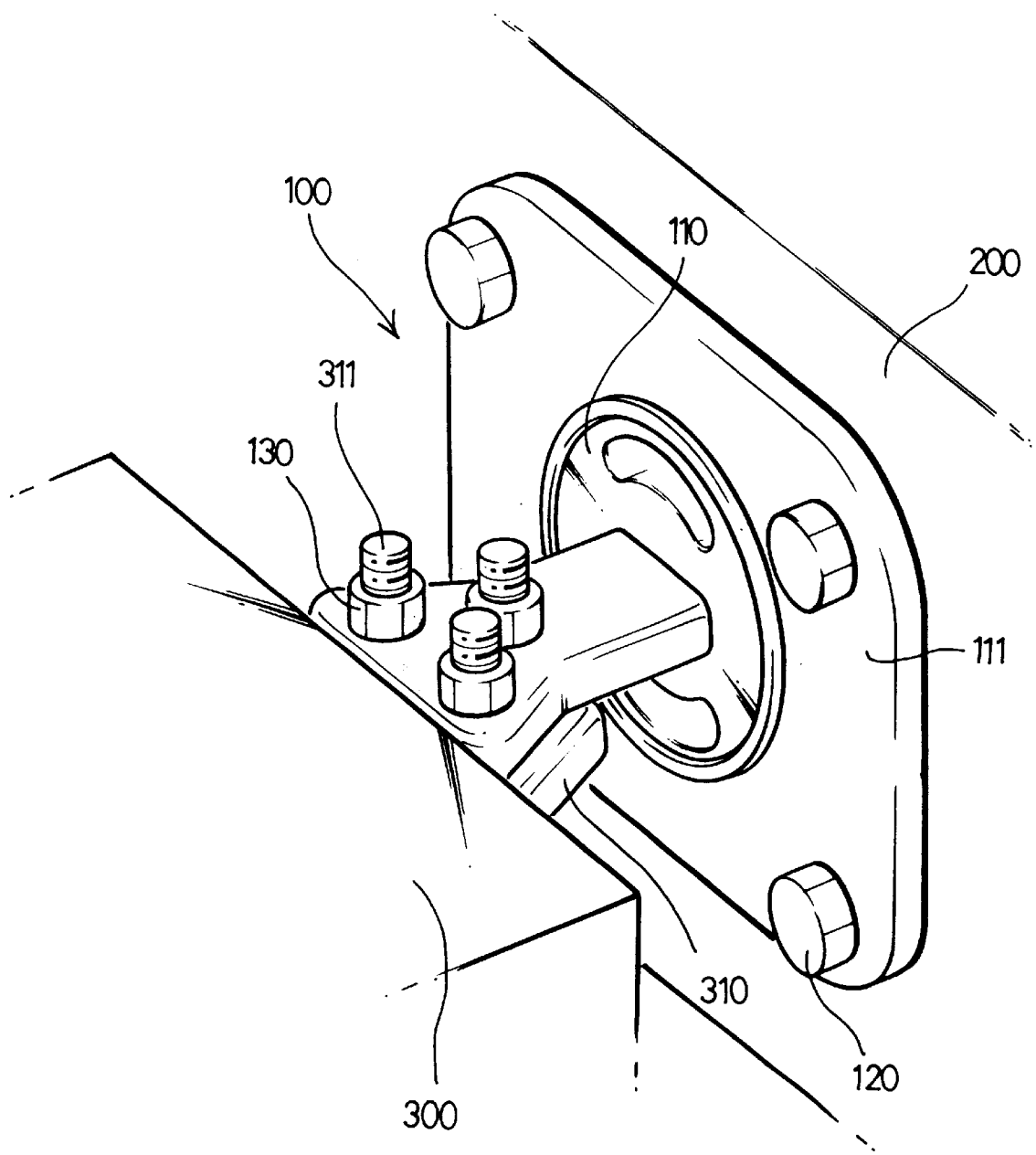
FIG. 3 is a perspective view showing the installation of the engine mount according to the present invention.

As shown in FIGS. 2 and 3, the invention discloses a mounting rubber bush 110, a fixing portion 111 and an engagement portion 112 formed in integral. The mounting rubber bush 110 being inserted into the frame 200 forming the vehicle body, the fixing portion 111 for engaging the mounting rubber bush 110 in the frame 200 by bolt 120, and the engagement portion 112 being engaged with the engine bracket 310 to connect to the power train 300.

The frame 200 has an insertion hole 210 of the same outer diameter with that of the mounting rubber bush 110 for receiving the mounting rubber bush 110, and engagement holes 211 around the insertion hole 210 for securing the mounting rubber bush 110 in the frame 200.

The engagement portion 112 has an engagement hole 112a at which a stud bolt 311 formed in the engine bracket is inserted into and engaged with by a nut 130. The center and inner diameter of the engagement hole 112a correspond to those of the stud bolt 311 respectively.

In order that the engine mount 100 prevents the vibration and noise from directly transmitting to the frame 200 constituting the vehicle body, which results in lowering the passengers' comfort, the present invention installs the engine mount 100 in the engine room as follows:

The mounting rubber bush 110 is inserted into the insertion hole 210 formed in the frame 200, and the fixing portion 111 is secured to the frame 200 via the bolt 120.

The engagement portion 112 is engaged to the engine bracket 310 formed in the power train 300. The engagement hole 112a is formed in the engagement portion 112, which the stud bolt 311 of the engine bracket 310 is inserted into and engaged with via the nut 130. Therefore, the mounting rubber bush 110 is connected to the power train 300.

Accordingly, the present invention reduces the number of assembly components, improves the assembly workability and decreases the manufacturing costs.

Further, the mounting rubber bush supporting a power train can be installed at a desired position having a minimum installation space, without interference with the other installations in the engine room, thereby improving performance of vehicles.

The present invention is not limited to these embodiments, and it should be clear to those skilled in the art that other embodiments are possible within the spirit and scope of the invention claimed.

What is claimed is:

1. A vehicle engine mount, comprising: a mounting ruber bush for insertion into an opening formed on a frame forming a vehicle body, a fixing portion for coupling the mounting rubber bush to the frame and an engagement portion for connecting to an engine bracket for coupling the mounting rubber bush to a power train, wherein the mounting rubber bush, the fixing portion, and the engagement portion are integrally formed.

2. A vehicle engine mount as claimed in claim 1, wherein the opening is a hole that has a diameter that is the same as an outer diameter of the mounting rubber bush, and wherein the frame has an engagement hole for engagement by a bolt connecting the fixing portion to the frame.

3. A vehicle engine mount as claimed in claim 1, wherein the engagement portion has an engagement hole for receiving a stud bolt formed at the engine bracket.

4. A vehicle engine mount used with a frame forming a vehicle body, an engine bracket and power train and comprising: a mounting rubber bush, a fixing portion and engagement portion, being integrally formed, the mounting rubber bush being insertable into an opening formed on the frame forming the vehicle body, the fixing portion is coupled to the frame by a bolt to maintain the mounting rubber bush on the frame, and the engagement portion being coupled to an engine bracket, the engagement portion connecting the the mounting rubber bush to a power train.

5. A vehicle engine mount as claimed in claim 4, the opening is a hole having the same diameter as an outer diameter of the mounting rubber bush, wherein the fixing portion is adapted to receive the bolt for engagement with an engagement hole in the frame at a location exterior to the opening, the fixing portion having a surface for contacting the frame at a location exterior to the opening.

6. A vehicle engine mount as claimed in claim 4, wherein the engagement portion has an engagement hole in which there is insertable a stud bolt formed at the engine bracket.

\* \* \* \* \*